Patented Mar. 7, 1933

1,900,162

UNITED STATES PATENT OFFICE

LEO P. CURTIN, OF CRANBURY, NEW JERSEY, ASSIGNOR TO CURTIN-HOWE CORPORATION, OF NEW YORK, N. Y., A CORPORATION OF NEW YORK

ZINC-META-ARSENITE

No Drawing.   Application filed June 21, 1930.   Serial No. 462,941.

In my prior Patent No. 1,659,135, patented February 14, 1928 I have described and claimed a method of preserving wood and other cellulosic materials comprising impregnating the wood with a clear solution adapted upon standing to deposit zinc-meta-arsenite $Zn(AsO_2)_2$. Such deposition is accompanied by the liberation, and escape as vapor, of an equivalent quantity of acetic acid. Since the meta-arsenite is deposited only in proportion as the acetic acid escapes, a relatively long time is required to complete the reaction.

The present invention relates to the preservation with zinc-meta-arsenite of manufactured sheets, blocks, or other forms having a base of plant fiber. Such manufactured products are marketed under a variety of names (Celotex, Insulite, Masonite, etc.) and are commonly used for heat or sound insulation, interior walls or wall coverings, etc. The plant fiber used may be derived from wood by mechanical or chemical treatment, from bagasse, licorice-root, the stems of cereal plants and other grasses, etc.

In the commercial manufacture of such insulating or structural materials (hereafter collectively referred to as wallboard) a suspension is made of the fiber in considerable water, the proportion of fiber to water ranging in practice from about 1:33 to 1:200. This suspension is felted upon a Fourdrinier machine or similar device, the liquid portion being in some cases rejected and in others returned to the cycle for re-use. The wet, felted fiber, which contains suitable sizing and binding materials, is then sent to the drying ovens.

The direct application of the method disclosed in my prior Patent No. 1,659,135 to such a product as the above is disadvantageous because of the liberation of acetic acid vapors in the drying ovens. The combination of water vapor and acetic acid is rather corrosive to the metal parts of the drying equipment; and it is one object of the present invention to introduce the zinc-meta-arsenite into the wall-board under such conditions that this difficulty is obviated.

The zinc-meta-arsenite treatment may be applied in accordance with the present invention in several ways, certain of which will be described by way of illustration. In case the water is used in closed cycle the meta-arsenite, in powdered form, and preferably prepared in the novel manner described below, may be suspended in and thoroughly distributed through the liquid carrying the fiber, before the felting of the latter. After felting and drying the sheet will be found to be impregnated with the meta-arsenite. However this mode of operation is not economically applicable to cases where the water flowing off from the felted fibers is rejected, on account of the heavy losses of the suspended meta-arsenite.

An alternative method, which I regard as preferable in most cases, is more generally applicable. The fiber, after felting on the Fourdrinier and before drying is treated successively, by spraying or otherwise, with two solutions, as hereinafter described, which react quickly to deposit zinc-meta-arsenite upon and throughout the mass of fiber. Excess water may then be pressed out and the wallboard dried as usual. No corrosive substances are liberated during the drying, and the dried wallboard is found to be quite uniformly impregnated with microscopic crystals of zinc-meta-arsenite.

The two solutions above mentioned are prepared as follows:

Solution A

An aqueous solution of a soluble zinc salt, preferably zinc sulphate, is prepared, preferably without heating. A suitable concentration is 15%, calculated as zinc sulphate.

Solution B

Arsenious oxid is dissolved in water by heating to the boiling point for some time, preferably in the presence of small proportions of soda ash, sodium hydroxid or sodium arsenite, which act to facilitate and accelerate the solution of arsenious oxid in water, as more fully described in my co-pending application Serial No. 163,575. The resulting solution is cooled to room temperature, and after cooling sodium bicarbonate is dissolved in it, in proportions as indicated below. A suitable concentration is 4% $As_2O_3$.

The reaction which occurs when these two solutions are mixed in proper order may probably be represented by the following equation:

$$ZnSO_4 + As_2O_3 + 2NaHCO_3 \rightleftarrows Zn(AsO_2)_2 + Na_2SO_4 + H_2O + 2CO_2$$

The zinc sulphate and arsenious oxid are preferably used in the proportions indicated by the above equations, that is to say in equimolecular proportions. The proportion of sodium hydrogen carbonate used is preferably approximately 95% of the quantity indicated by the equation.

In the treatment of the wallboard, the cellulosic fibers, after being felted on the Fourdrinier are sprayed or otherwise wetted with Solution A, and thereafter with Solution B. The material may be squeezed through the rolls after the addition of either solution, or of both solutions, as desired, and thereafter dried.

In the industrial manufacture of wallboard and similar products the water in which the fiber is suspended is in nearly all cases slightly acid, the hydrogen ion concentration ranging usually from pH 5.5 to pH 6.8.

Of the various arsenites of zinc, the meta-arsenite alone is stable under such conditions of slight acidity. Below pH 5.5 all arsenites of zinc pass into solution, while under neutral or alkaline conditions, zinc ortho-arsenite or basic ortho-arsenites are formed. Between pH 6.5 and pH 7.0, a mixture of ortho and meta-arsenites may exist. For reasons which need not be further discussed, it is not practicable to handle the cellulosic fiber in neutral or alkaline solutions. It has long been known that zinc-meta-arsenite could be produced by the inter-action of a soluble salt of zinc, and a soluble arsenite providing the hydrogen ion concentration could be maintained within certain very narrow limits. It was once proposed to use zinc-meta-arsenite as a substitute for Paris green, but the manufacturing difficulties were such that the material was never produced commercially. It was too difficult to maintain the precise hydrogen ion concentration necessary for the production of this material without admixture of zinc ortho-arsenite.

The method as described above for precipitating zinc-meta-arsenite upon a sheet or mass of fiber, is applicable also to the preparation of substantially pure zinc-meta-arsenite upon an industrial scale; and such operation constitutes a part of my present invention. Solutions A and B are prepared as described above, and Solution B is then added to Solution A with stirring, the mixture being heated for some time either with or without evaporation of water. The precipitated zinc-meta-arsenite is recovered, washed and dried.

If the sodium bicarbonate were added to a hot solution of arsenious oxid, a great deal of the carbonic acid would be driven out by the arsenious acid, and the product obtained by mixing Solutions A and B would be a mixture of ortho and meta-arsenites of zinc, probably in the proportions of about 80 parts of ortho and 20 parts of meta-arsenite. By cooling the arsenious oxid solution before the addition of sodium bicarbonate, little or no inter-action of the two substances takes place, and the carbonic acid is conserved. When Solution B is poured into Solution A, the carbonic acid, which is present, serves to keep the hydrogen ion concentration of the solution within the range in which only zinc-meta-arsenite is precipitated. There is, of course, some slight acidity from the zinc sulphate itself and from the arsenious acid, which is duly taken into account.

Zinc-meta-arsenite prepared in this manner contains little or no zinc ortho-arsenite, and, after washing to remove adhering solution, it is almost chemically pure. The deposit occurs in the form of exceedingly small crystals and the yield is almost quantitative. It is possible to obtain similar results when a considerable excess of arsenious oxid is used, so that my invention is not limited to the specific proportions above stated, provided only that the amount of carbonate is so proportioned to the other components of the solutions as to assure the precipitation of a commercially pure zinc-meta-arsenite.

What I claim is:

1. Method of making wallboard or like article comprising precipitating zinc-meta-arsenite in the presence of a plant fiber, and shaping and drying the fiber.

2. Wallboard or like article comprising a shaped and dried body of initially loose plant fiber having crystals of zinc-meta-arsenite disseminated therethrough.

3. Method which comprises reacting, in the presence of plant fiber, upon a zinc salt in aqueous solution with arsenious oxid and a carbonate, the reagents being proportioned to yield on the fiber a precipitate consisting substantially of zinc-meta-arsenite.

4. Method as defined in claim 1 in which the zinc-meta-arsenite is precipitated in the presence of the plant fiber and a sizing and binding material.

5. Wallboard or like article as defined in claim 2 comprising a sizing and binding material.

In testimony whereof, I affix my signature.

LEO P. CURTIN.